Patented Dec. 6, 1938

2,138,830

UNITED STATES PATENT OFFICE 2,138,830

PRODUCTION OF ABRASIVE ARTICLES

Raymond C. Benner and Peter de Leeuw, Niagara Falls, N. Y., assignors, by mesne assignments to The Carborundum Company, Niagara Falls, N. Y., a corporation of Delaware No Drawing. Application July 27, 1936,
Serial No. 92,924

4 Claims. (Cl. 51—280)

This invention relates to the production of bonded abrasive articles wherein the abrasive content consists wholly or in part of granular silicon carbide. More particularly the invention relates to the bonding of silicon carbide abrasive grain into hard dense abrasive articles by the reaction of lime (or other alkaline earths such as MgO, SrO and BaO) with silica and other compounds.

The invention has for a principal object the production of silicon carbide abrasive articles which are hard, strong and unaffected by extreme temperatures. Another object of the invention is to provide a method of making silicon carbide abrasive articles which avoids the use of extreme temperatures and in which the size of the article made involves no special problem.

The invention contemplates the formation of bonded silicon carbide abrasive articles by the hydrothermal reaction of lime or other alkaline earths and silica, with or without the addition of other materials, such as finely divided alumina, or aluminous compounds such as $3Al_2O_3.2SiO_2$, $CaO.Al_2O_3.2SiO_2$, $5CaO.3Al_2O_3$, and $Al_2O_3.MgO$. The invention further contemplates improving the strength of articles made as described above by a preliminary roasting of the silicon carbide abrasive grain whereby there is formed on the surface of each granule a coating of silica which enters into the bonding reaction and assists in the formation of a strong bond structure.

The invention will be described by reference to specific embodiments, but it will be understood that the invention is not thereby limited but it is directed broadly to the production of bonded silicon carbide abrasive articles by the hydrothermal reaction of a plurality of compounds including essentially an alkaline earth and silica.

The new abrasive articles are hardened by application of heat and pressure in the presence of moisture. This is conveniently accomplished by subjecting the article to saturated steam, for example in an autoclave. The steam pressure used should not be so high as to exceed the inversion point of the reaction product formed and a pressure of 100 to 300 pounds per square inch is ordinarily satisfactory. The most favorable pressure will depend upon the composition of the mixture used in forming the article.

The abrasive grain used will naturally be selected with reference to the use to which the abrasive article is to be put. However, for the production of relatively dense articles, such as pulp wheels, it is advisable to select grains having a range of sizes to cause the particles of the mix to pack properly and form a dense article when the mixture is pressed or tamped in a mold.

The description of the invention refers to specific embodiments in which the grain used consists of a mixture of grit sizes ranging from 5 or 6% of a size which will be retained on a 54 mesh screen to about 10% which will pass through a 97 mesh screen, the bulk being of a size which will be retained on a 70 mesh screen. This size is selected merely for purposes of illustration in order that the various embodiments may be comparable, and it is to be understood that the invention is in no way limited to the use of the size or combination of grits used in the specific embodiments.

It is preferable that the bond ingredients should be prepared in a finely divided condition. Ball milling the ingredients is of assistance in this connection. It is also preferable that the mixing of the bond ingredients and the silicon carbide grain be as thorough as possible. Preferably the dry ingredients are mixed thoroughly first and the water, necessary to render the mix sufficiently damp for molding or tamping, is then added very slowly while mixing. Too rapid addition of water to the mix causes the agglomeration of binder into lumps which cause weak spots in the resulting structure and non-uniformity. These lumps also cause uneven expansion of the article during the hardening process with the result that cracks may be formed in the article.

The amount of water added to the mix should in general be not more than is necessary to prevent the formation of pressure cracks. If too much water is added the articles will, after molding, be more or less soft and easily subject to mechanical strain during handling.

The mix may be formed into articles of the desired size and shape by forming them in a mold of suitable dimension and consolidating them by means of a ram or by tamping. The pressure should be high enough, in the case of a ram, to thoroughly consolidate the mixture and pressures of 3000 to 6000 lbs./sq. inch are suitable for this purpose. The articles formed by tamping are subjected to the hardening step in a closed mold.

The bond ingredients consist essentially of lime, or other alkaline earths, and silica which may be in the form of flint though other silica-bearing or siliceous material may be used. To assist in the reaction there may be added other ingredients such as finely divided alumina which may be in the form of levigated alumina, or other aluminous compounds.

Example I 12 parts lime and 18 parts finely divided silica, preferably of the order of magnitude of 600 mesh, are intimately mixed in the dry condition. These ingredients may be ball milled to improve the fineness and uniformity of mixture. 30 parts of the lime-silica mixture are then mixed with 70 parts of silicon carbide abrasive grain having a grit size as described above so that there is complete mixture of the bond components with the abrasive grain. Water is then slowly added to the mix while agitating the grain to prevent the formation of bond lumps, until the mix is slightly damp. The damp mix may then be screened through a 12 mesh screen to further insure uniformity of the mixture. The mix is then molded into articles of the desired shape, for example in a pressure mold under a pressure of 3000 lbs./sq. inch. Articles thus formed are cured and hardened in an autoclave having a saturated steam pressure of 120–140 lbs./sq. in. for a period of from 17 to 24 hours.

Example II

A portion of the silica in the above example may be replaced with a small proportion of finely divided aluminum oxide, for example levigated alumina. 12 parts lime, 16 parts flint, preferably of the order of magnitude of 325 mesh and finer, and 2 parts levigated alumina are intimately mixed in the dry condition. The ingredients may be ball milled to improve the fineness and uniformity of mixture. 70 parts silicon carbide abrasive grain are then added and intimately mixed in the dry condition. Water is then added, while mixing to prevent the formation of bond lumps, to form a slightly damp mix. The damp mix is then screened through a 10 mesh screen to further insure uniformity and molded into articles of the desired shape, for example in a mold under a pressure of 3000 lbs./sq. inch. The article may then be stored for 12 days under sand before curing but this is not necessary. The article is cured and hardened in an autoclave having a saturated steam pressure of 195–210 lbs./sq. inch for 8 hours.

Example III

The use of silicon carbide abrasive grain having surface coatings of silica results in a substantial increase in strength over articles formed from unoxidized silicon carbide. The oxidization of silicon carbide may be accomplished by roasting the grain, for example as described in application Serial No. 41,833, filed September 23, 1935, by Otis Hutchins. 70 parts of oxidized silicon carbide are intimately mixed with a binder consisting of 12 parts lime, 16 parts silica and 2 parts finely divided aluminum oxide as described in the above example. The mixture thus prepared is dampened, molded and cured as described, and it is found that the articles so produced have a strength about 40% greater than articles produced according to the procedure of the example above.

The levigated alumina used in Example II is made up of fine particles of colloidal size which cohere to form the grains of the material. These grains are broken up substantially by the mixing of the ingredients so that the size of the levigated alumina is not important if the mixing is thorough.

The fine alumina used need not be levigated alumina as finely divided fused aluminum oxide may be used. This material should ordinarily be 400 mesh or finer. The proportions of the ingredients used in the above formulae are merely for purposes of example and may be varied between relatively wide limits without greatly affecting the results.

It is found that soaking the articles produced by this invention in boiling water after curing permanently increases their strength, with the articles having a higher initial strength showing a relatively lower percentage increase than articles having a lower initial strength. For example, immersing the article produced as described in the above examples produces an increase in strength after 30 days' immersion in hot water of 25 to 40%. As an example of strength in the articles produced according to the present invention, it is noted that a tensile strength of articles made according to Example III above and soaked in hot water for 30 days run as high as 1200 lbs./sq. inch. Immersion may be carried out at atmospheric pressure or under pressure for example by flooding the autoclave after a predetermined period of steam pressure.

In molding a relatively high molding pressure has a favorable effect on the strength of the article produced. The degree of pressure used depends upon the ingredients of the mixture, the fineness of subdivision and the consistency, which is largely governed by the amount of water present. Where the water is in excess so that the pressing operation causes the deposition of water on the mold, the use of higher pressure is generally not advisable. However, with dry mixes or those which have just the right amount of water it is found that increasing the molding pressure from 3000 lbs./sq. inch to 6000 lbs./sq. inch produces an increase in strength in the resulting article. After molding it is advisable to store the articles in the green state under sand for a few days before curing, as it is found that this improves the strength of the cured article.

In contrast to articles made with other bonds those produced by the present invention do not lose strength when subjected to the leaching action of boiling water, but on the contrary usually become stronger. The formation of large monolithic articles, such as monolithic pulp wheels, does not offer special difficulties in the present invention because the pressure-temperature relationships insure uniformity of curing throughout the mass regardless of size. The time required for curing is shorter than that for most other abrasive bonds. A good strength may be obtained in a few hours. Reinforcements, such as metal or mineral articles, may be placed in the article during the molding and the curing process will not affect them.

After pressing and before induration the article has a certain hardness which permits easy alterations in shape by shaving or other means, and the hardened article will have the exact shape to which it is molded or to which it is altered, as the changes in size during induration are insignificant.

We claim:

1. A bonded abrasive article comprising abrasive grain and the hydrothermal reaction product of CaO, $SiO_2$ and $Al_2O_3$.

2. A bonded abrasive article comprising silicon carbide abrasive grain and a binder comprising the hydrothermal reaction product of lime, finely divided siliceous material, and a substance selected from the group of derivatives of aluminic acid consisting of $3Al_2O_3.2SiO_2$, $CaO.Al_2O_3.2SiO_2$, $5CaO.3Al_2O_3$, $Al_2O_3.MgO$, and $Al_2O_3$.

3. The method of making bonded abrasive articles which comprises the steps of roasting silicon carbide abrasive grain in the presence of oxygen to form an adherent film of silica on the surface of said grains, intimately admixing said roasted grain, lime, finely divided silica and water, compacting and molding said mass in the shape desired and subjecting the shaped mass to the action of heat in the presence of water vapor to prevent the evaporation of essential reacting water.

4. The method of making bonded abrasive articles which comprises the steps of roasting silicon carbide abrasive grain in the presence of oxygen to form an adherent film of silica on the surface of said grains, intimately admixing said roasted grain, lime, finely divided silica and water, compacting and molding said mass in the shape desired and subjecting the shaped mass to the action of heat in the presence of water vapor to prevent the evaporation of essential reacting water, and thereafter immersing the thus formed article in hot water.

RAYMOND C. BENNER.
PETER DE LEEUW.